United States Patent [19]
Maichel

[11] Patent Number: 5,660,199
[45] Date of Patent: Aug. 26, 1997

[54] METHOD AND VALVE FOR HOT TAPPING A LINE

[76] Inventor: Jeffrey L. Maichel, International Flow Technologies, 30230 Los Alamos Rd., Murrieta, Calif. 92563

[21] Appl. No.: 368,677

[22] Filed: Jan. 4, 1995

[51] Int. Cl.$^6$ .................................................. F16K 43/00
[52] U.S. Cl. ........................... 137/15; 137/318; 138/943; 138/97
[58] Field of Search ........................... 137/15, 315, 318; 138/94, 94.3, 97; 29/402.08

[56] References Cited

U.S. PATENT DOCUMENTS

| | | | |
|---|---|---|---|
| 463,524 | 11/1891 | Madden | 137/318 |
| 485,717 | 11/1892 | Smith | 137/318 |
| 511,327 | 12/1893 | Eley | 137/318 |
| 582,230 | 5/1897 | Richardson | 137/318 |
| 2,763,282 | 9/1956 | Reedy et al. | 137/318 |
| 2,899,983 | 8/1959 | Farris | 137/318 |
| 2,964,290 | 12/1960 | Mueller | 137/318 |
| 2,983,477 | 5/1961 | Merrill | 137/318 |
| 3,091,260 | 5/1963 | Milanovits et al. | 138/94 |
| 3,773,067 | 11/1973 | Ray | 137/318 |
| 3,799,182 | 3/1974 | Long | 137/318 |
| 3,891,146 | 6/1975 | Blazek | 138/94.3 |
| 3,948,282 | 4/1976 | Yano | 137/318 |
| 4,141,378 | 2/1979 | Wegner et al. | 137/315 |
| 5,074,526 | 12/1991 | Ragsdale et al. | 137/318 |

OTHER PUBLICATIONS

Manual entitled "Line Stopping and Equipment Options" published 1992 by International Flow Technologies, Inc.
Manual entitled "Hot Tapping and Equipment Options" published 1992 by International Flow Technologies, Inc.
Product Brochure for a Rovalve Figure 220 Bonneted Knife Gate Valve Published 1192 by Technaflow, Inc.
Product Catalog entitled "American–Darling Butterfly Valves" published 1992 by American Cast Iron Pipe Company of Birmingham, Alabama.

*Primary Examiner*—George L. Walton
*Attorney, Agent, or Firm*—Loyal McKinley Hanson

[57] ABSTRACT

A method of hot tapping a pipeline includes the step of providing a valve having a valve body, a bonnet on the valve body, and means in the form of an isolating mechanism for enabling a user to seal the valve body from the bonnet for purposes of removing the bonnet with the valve in use. The method proceeds by (i) connecting the valve body to a line to be tapped and a hot tapping machine to the valve body; (ii) hot tapping the line through the valve body with the valve open, withdrawing the hot tapping machine from the valve body, closing the valve, removing the hot tapping machine, and connecting a desired downstream component; (iii) sealing the valve body from the bonnet with the isolating mechanism; and (iv) removing the bonnet from the valve body. In line with the above, a valve for hot tapping a line includes a valve body, a movable gate, a removable bonnet with a gate actuating mechanism, and a bonnet isolating mechanism for enabling a user to seal the valve body from the bonnet for purposes of removing the bonnet.

8 Claims, 4 Drawing Sheets

METHOD AND VALVE FOR HOT TAPPING A LINE

BACKGROUND OF THE INVENTION

1. Technical Field

This invention relates generally to procedures and equipment for hot tapping a pipeline, and more particularly to a hot tapping method and valve that provide increased component flexibility as well as size, weight, and cost advantages.

2. Description of Related Art

"Hot tapping" refers to the procedures and equipment a worker employs to add a branch connection to an existing pipeline while it contains a fluid (often pressurized) without shutting down service. Any size and type of pipeline may be involved. To hot tap a line, the worker bolts or welds a fitting on a section of pipe in the line to form a tapping outlet structure (e.g., a flange). Next, he takes a conventional gate valve or other suitable hot tapping valve and bolts the upstream side of the valve body on the tapping outlet.

Once the tapping valve is mounted on the pipe, he bolts a conventional hot tapping machine to the downstream side of the valve body. The hot tapping machine includes a motorized hole saw for sawing a hole in the pipe. After mounting it and pressure testing the hookup, the worker advances the hole saw through the body of the tapping valve with the valve mechanism in an open position. Next, he saws a hole in the wall of the pipe.

He then proceeds by retracting the hole saw sufficiently to close the valve mechanism of the tapping valve. After closing the tapping valve, he removes the tapping machine. That leaves the closed tapping valve connected to the pipeline and ready for service, and he may then connect a pipe, gauge, sensor, or other component to the downstream side of the valve body and open the valve when desired.

Hot tapping a line that way is well known. However, the size, weight, and expense of the gate valve employed can present problems, especially for 24 inch to 48 inch and larger pipelines. Although butterfly valves are usually smaller, lighter, and less expensive than gate valves, the conventional hot tapping procedures just described do not work with them. Existing hot tapping procedures do not work with many other components either, including globe valves, check valves, back flow preventers, and no-valve technologies. Therefore, workers need a better way for hot tapping an existing pipeline.

SUMMARY OF THE INVENTION

This invention solves the problems outlined above by providing a valve that is similar in some respects to a conventional bonneted gate valve, but which includes a bonnet isolating mechanism. After bolting the valve body to a hot tapping outlet on the pipeline and then hot tapping the line through the valve body, the worker closes the valve, removes the hot tapping machine, and connects a desired downstream component. Then, he completes the hot tapping procedure of this invention by opening the valve to withdraw the gate fully into the bonnet, actuating the bonnet isolating mechanism to seal the valve body from the bonnet, and removing the bonnet from the valve body.

That leaves just the smaller, lighter, and less expensive valve body connected to the pipeline, along with whatever downstream components are connected to the valve body. So, the hot tapping procedure of this invention enables use of most any downstream component, including butterfly valves, glove valves, check valves, back flow preventers, gauges, sensors, and no-valve technologies. In addition, the larger, heavier, and more expensive bonnet is free for reuse elsewhere, and a bonnet can always be reattached to the valve body whenever desired in the future for pipeline servicing.

To paraphrase the language subsequently presented in the claims, a method of hot tapping a pipeline includes the step of providing a valve having a valve body, a bonnet on the valve body, and means in the form of an isolating mechanism for enabling a user to seal the valve body from the bonnet for purposes of removing the bonnet with the valve in use. The method proceeds by (i) connecting the valve body to a line to be tapped and a hot tapping machine to the valve body; (ii) hot tapping the line through the valve body with the valve open, withdrawing the hot tapping machine from the valve body, closing the valve, removing the hot tapping machine, and connecting a desired downstream component; (iii) sealing the valve body from the bonnet with the isolating mechanism; and (iv) removing the bonnet from the valve body.

More specifically, the valve has a valve body with two sides. One side of the valve includes a first port that will be connected to the line being tapped and it is referred to subsequently as an upstream side. The other side of the valve body includes a second port that will be connected to downstream components and it is referred to as a downstream side.

The valve includes a movable gate and a removable bonnet. The removable bonnet includes means in the form of a gate actuating mechanism for enabling a user to move the gate between a CLOSED GATE POSITION in which the valve is closed with the gate within the valve body intermediate the first and second ports, and an OPEN GATE POSITION in which the valve is open with the gate within the bonnet. The bonnet isolating mechanism mounts on the valve body between the valve body and the bonnet. There it serves the function of enabling the user to selectively seal the valve body from the bonnet when the gate is in the OPEN GATE POSITION for purposes of removing the bonnet.

The method proceeds more specifically by (i) connecting the first port of the valve body to a hot tapping outlet on the pipeline, connecting a hot tapping machine to the second port the valve body, advancing the hot tapping machine through the valve body with the gate in the OPEN GATE POSITION and operating the hot tapping machine to thereby tap the pipeline; (ii) withdrawing the hot tapping machine from the valve body, operating the gate actuating mechanism to move the gate to the CLOSED GATE POSITION, removing the hot tapping machine from the second port of the valve body, and connecting a desired downstream component to the second port; (iii) operating the gate actuating mechanism to move the gate to the OPEN GATE POSITION; (iv) operating the bonnet isolating mechanism to seal the valve body from the bonnet; and then (v) removing the bonnet from the valve body.

In line with the above, a valve for hot tapping a line includes a valve body, a movable gate, a removable bonnet with a gate actuating mechanism, and a bonnet isolating mechanism between the valve body and the removable bonnet. Apart from the bonnet isolating mechanism, those components may be similar in many respects to the components of existing gate valves. They and the bonnet isolating mechanism may be fabricated by one of ordinary skill in the art based upon the foregoing and subsequent descriptions. The following illustrative drawings and detailed description make the foregoing and other objects, features, and advantages of the invention more apparent.

DESCRIPTION OF THE PREFERRED EMBODIMENTS

Figure 1:
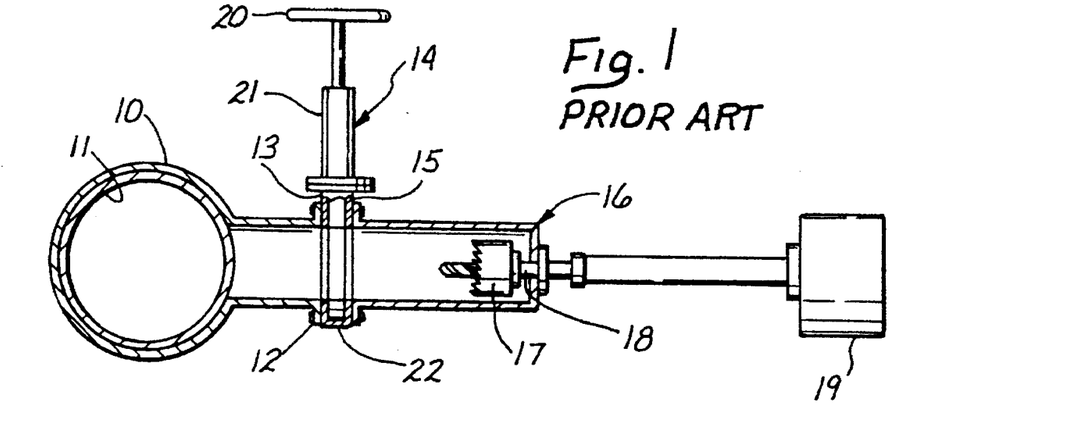
FIGS. 1-3 are schematic representation of various steps taken to hot tap a line according to the prior art.

FIGS. 1-4 show some of the known equipment and various known steps employed in hot tapping a line according to the prior art (sometimes called pressure tapping). First, a hot tapping outlet 10 (also referred to as a fitting) is bolted, welded, or otherwise suitably connected to a section of pipe 11 in the line that is to be tapped as depicted in FIG. 1. The tapping outlet 10 may take any of various known forms, including the illustrated saddle. It serves the function of providing a fluid-tight structure (e.g., a flange 12) to which a valve can bolted.

With the tapping outlet 10 in place, one side 13 (referred to herein as an upstream side 13 or first port 13) of a gate valve 14 (or other suitable valve for hot tapping) is bolted or otherwise suitably connected to the flange 13 (FIG. 1). Preferably, the assembly is then pressure tested with suitable pressure testing equipment (not shown) that is temporarily connected to the other side 15 (the downstream side 15 or second port 15) of the valve 14 in order to make sure that the assembly is essentially fluid tight.

Figure 2:
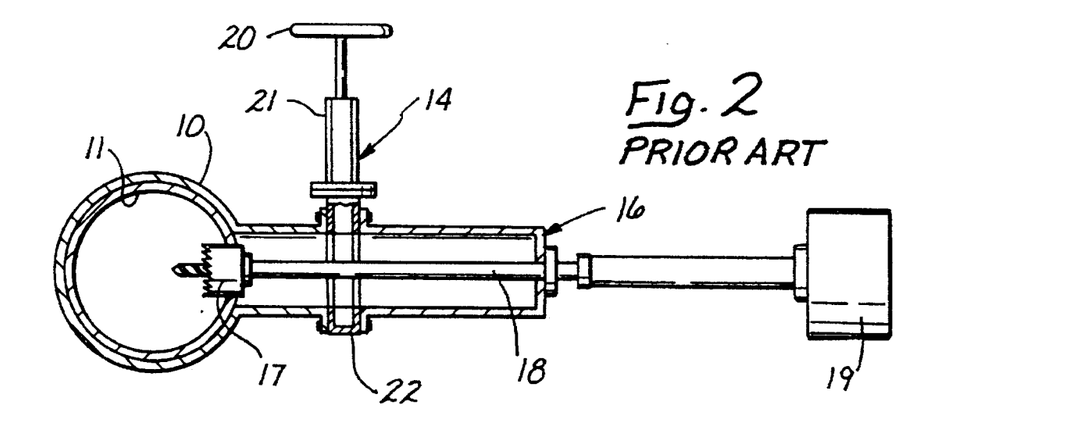

Next, the pressure testing equipment is removed and a tapping machine 16 is bolted or otherwise suitably connected to the downstream side 15 of the valve 14 as depicted in FIG. 1. The tapping machine 16 is a known piece of equipment having a hole saw 17 that is mounted on an extendable shaft 18 and driven by a motor 19. After rotating a handwheel 20 on the valve 14 in order to operate a valve actuating mechanism within a bonnet 21 of the valve 14 and thereby open the valve, the tapping machine is advanced through the body 22 of the valve 14 while the motor 19 drives the hole saw 17 to thereby saw a hole in the pipe 11 as depicted in FIG. 2. In other words, the shaft 18 of the hot tapping machine 16 is advanced through a the valve body 22.

Figure 3:
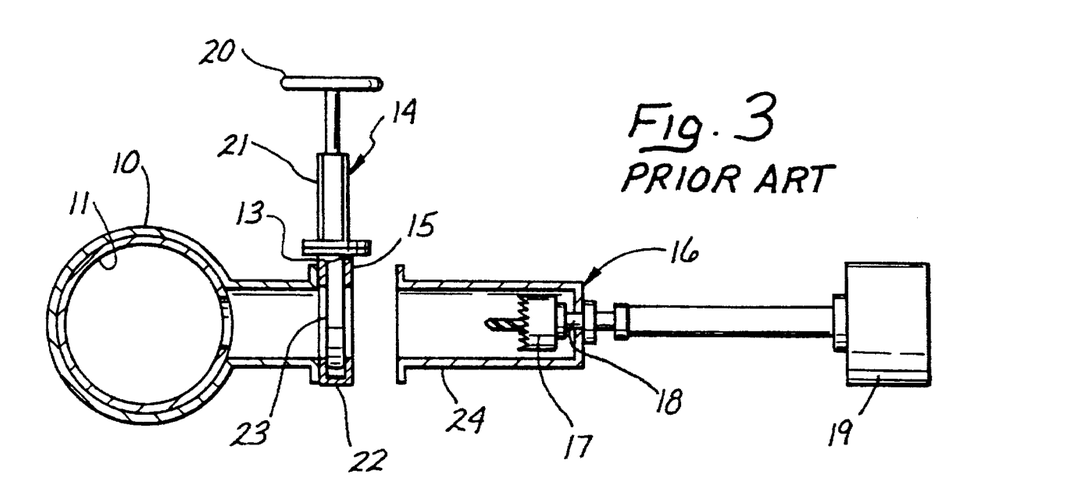

After sawing the hole, the hot tapping machine 16 (i.e., the shaft 18) is withdrawn from the valve 14 as depicted in FIG. 3. Next, the handwheel 20 is operated to close the valve 14 by moving a gate 23 of the valve 14 (FIG. 3) into a position in the valve body 22 intermediate the upstream side 13 and the downstream side 15 of the valve 14. Then, fluid is drained from the downstream side 15 of the valve 14 by, for example, draining it out of the body 24 (FIG. 3) of the hot tapping machine. Finally, the hot tapping machine 16 is removed from the valve 14, and that leaves the pipe 11 tapped and in fluid communication with the upstream side 13 of the valve 14, with the valve 14 ready for connection of a selected downstream component to the downstream side 15.

Figure 4:
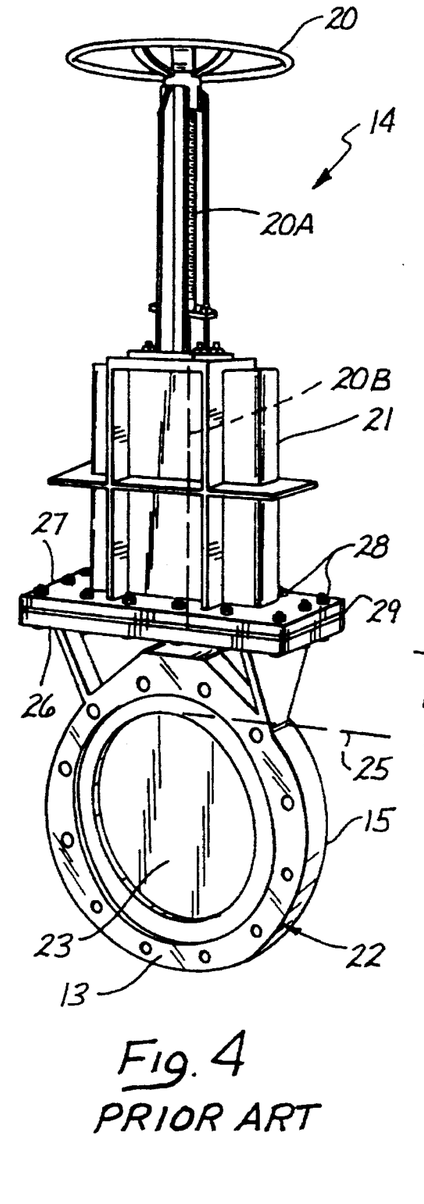
FIG. 4 is a three-dimensional view of a conventional bonneted gate valve used to hot tap a line according to the prior art.

FIG. 4 is an enlarged three-dimensional view of the prior art valve 14. It may take the form of a Bonneted Knife Gate Valve that is commercially available under the trademark ROVALVE from Technaflow, Inc. of Vancouver, Wash. It is fabricated from rugged cast iron, cast steel, and carbon steel components in a know manner to include a bonnet 21 mounted on a valve body 22.

As an idea of size, the illustrated prior art valve 14 is a massive 1150 pound component, with a valve body 22 that is about 4.5 inches thick between the upstream side 13 and the downstream side 15. The valve body 22 has an outside diameter of about 32 inches and an inside diameter of about 20 inches. With the valve 14 open as illustrated, the gate 23 occupies a position within the valve body 22 intermediate the upstream side 13 and the downstream side 15 and the cast iron handwheel 20 measures about 87 inches from the center of the valve body 22. With the valve open, the handwheel measures about 110 inches from the center of the valve body 22.

A known type of gate actuating mechanism 20A on the bonnet 21 responds to rotation of the handwheel 20 in a known manner by moving the gate 23 upwardly towards the handwheel 20 and partially into the bonnet 21. Portions of the gate actuating mechanism 20A within the bonnet 21 are shown diagrammatically with a dashed line 20B in FIG. 4. For the illustrated prior art valve 14, the amount of gate travel is about 23 inches from the illustrated closed gate position (i.e., the closed valve position) to an open gate position (i.e., the open valve position). With that amount of travel, the gate 13 clears the 20 inch inner diameter of the valve body 22 in the open gate position, with the lower edge of the gate 13 occupying a position above a level indicated in FIG. 4 by a dashed line 25. In that position, portions of the gate 23 lie within a flange 26 on the valve body 22 and a mating flange 27 on the bonnet 21 that are bolted together with bolts 28 and a gasket 29 in between, only two bolts 28 being designated in FIG. 4 to avoid cluttering FIG. 4 with reference numerals. Other portions of the gate 23 lie with the bonnet 21.

Figure 5:
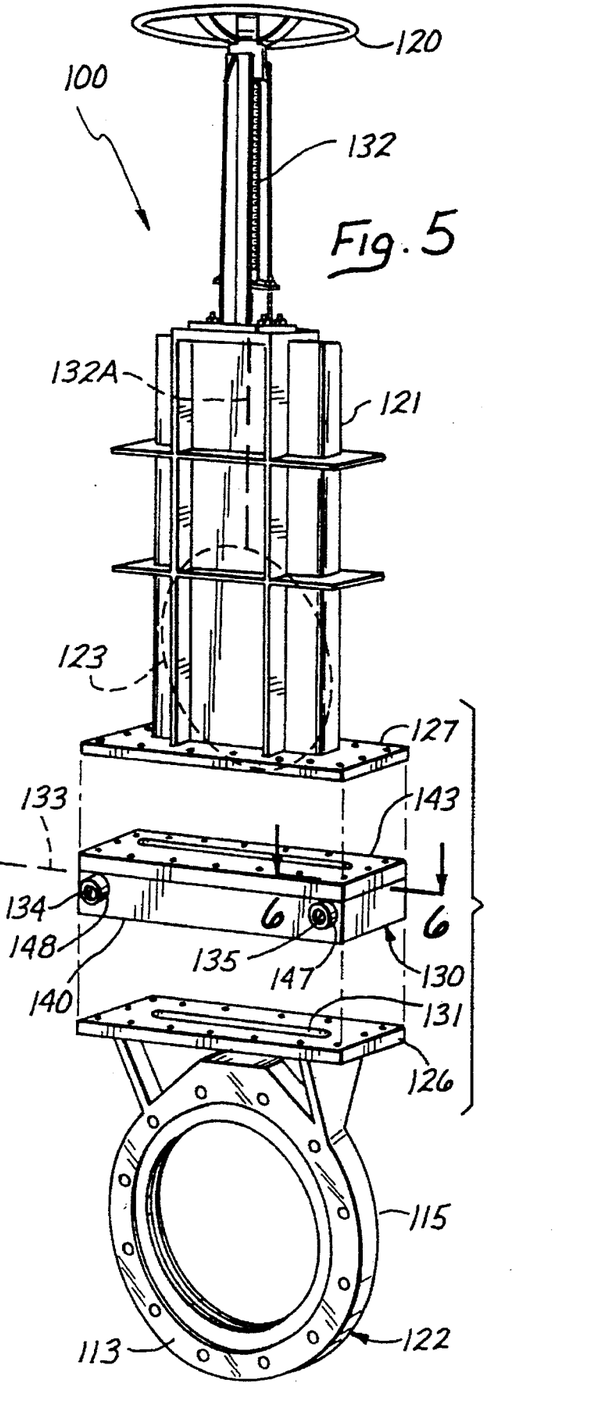
FIG. 5 is a three-dimensional view of a valve constructed according to the invention for dry tapping a line that is shown partially disassembled to emphasize the bonnet isolating mechanism.
Figure 6:
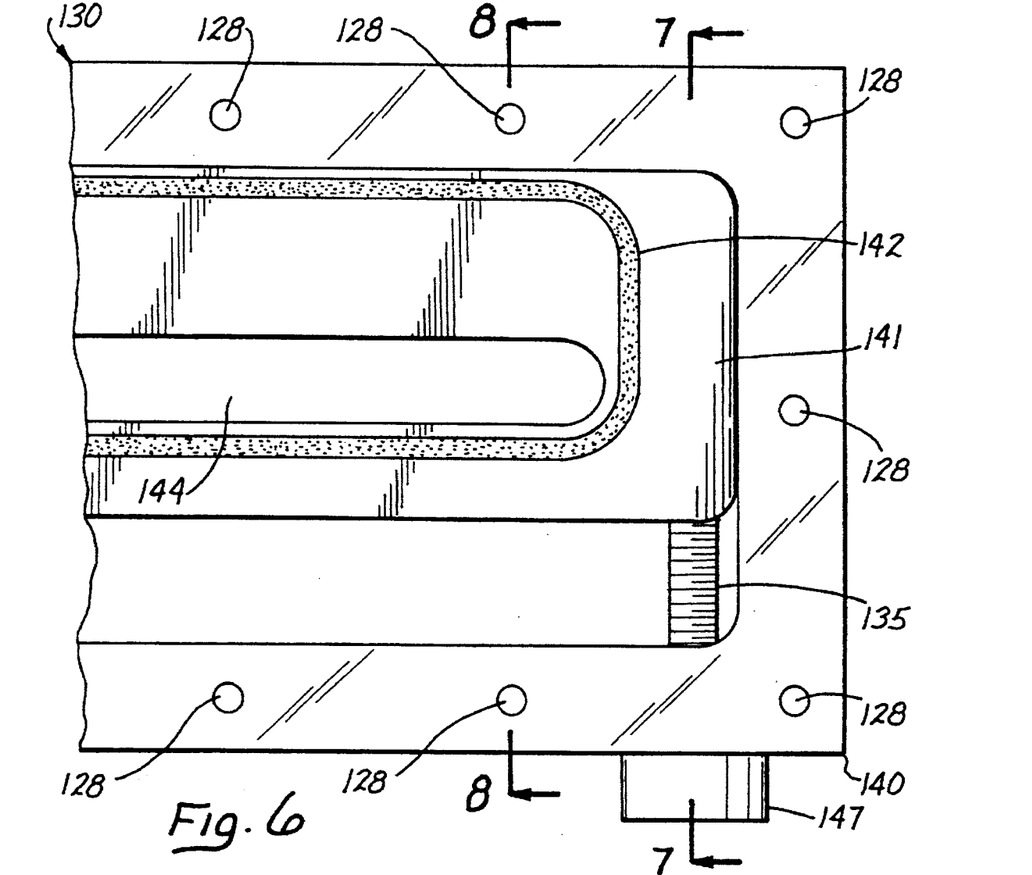
FIG. 6 is an enlarged view of a portion of the bonnet isolating mechanism taken on line 6—6 in FIG. 5 showing the isolating plate.

FIG. 5 shows a valve 100 constructed according to the invention. It is similar in some respects to the prior art valve 14. For convenience, reference numerals designating some of the parts of the valve 100 are increased by one hundred over those designating similar parts of the valve 14.

Somewhat like the prior art valve 14, the valve 100 includes a bonnet 121 mounted on a valve body 122. Those components are illustrated disassembled in FIG. 5. When assembled, a flange 126 on the valve body 122 and a flange 127 on the bonnet 121 (FIG. 5) bolt together in a manner similar to that for the prior art valve 14 with bolts 128 (FIGS. 6-9).

Unlike the prior art valve 14, however, the valve 100 includes a bonnet isolating mechanism 130 that occupies a position between the flange 126 and the flange 127. The bonnet isolating mechanism 130 serves the function of enabling a user to seal the valve body 122 from the bonnet 121. In other words, it enables the user to seal off an opening 131 in the valve body 122 through which the gate travels. Once that is done, the user can remove the bonnet 121 from the valve body 122 while the valve 100 is in use without fluid escaping through the opening 131.

Using longer bolts 128 (FIGS. 6–10) than the bolts 28 (FIG. 5) used for the prior art valve 14, the flanges 126 and 127 bolt together with the bonnet isolating mechanism 130 held in between them. In that regard, the bonnet isolating mechanism 130 might be said for descriptive purposes to physically replace the gasket 29 of the prior art valve 14, although a gasket can be included between the isolating mechanism 130 and the flange 126 without departing from the inventive concepts disclosed.

In addition to the bonnet isolating mechanism, the valve 100 includes a different bonnet configuration. Unlike the bonnet 21 of the prior art valve 14, the bonnet 121 of the valve 100 extends upwardly further than the bonnet 21 of the prior art valve 14 (i.e., it is taller). The bonnet 121 includes a gate actuating mechanism 132 that performs a function somewhat similar to that of the gate actuating mechanism 20A of the prior art valve 14, but which provides greater gate travel. Portions of the gate actuating mechanism 132 within the bonnet 121 are shown diagrammatically by a dashed line 132A. The gate actuating mechanism 132 responds to rotation of the handwheel 120 by withdrawing the gate 123 of the valve 120 into the bonnet 121—further into the bonnet 121 than its prior art counterpart. Of course, the gate actuating mechanism 132 may take any of suitable forms for actuating the gate without departing from the inventive concepts disclosed, including mechanical, hydraulic, pneumatic, and even electrical actuating components.

The gate actuating mechanism 132 withdraws the gate of the valve 120 from a CLOSED GATE POSITION to an OPEN GATE POSITION. In the CLOSED GATE POSITION, the gate 123 is within the valve body 122 intermediate the first and second ports 113 and 115 (similar to the closed gate position shown in FIG. 4 for the prior art valve 14). In the OPEN GATE POSITION, the gate is within the bonnet 121 (as depicted by the gate 123 shown in dashed lines in FIG. 5) sufficiently far to clear a level on the bonnet isolating mechanism 130 indicated in FIG. 5 by a dashed line 133.

Based upon the foregoing and subsequent descriptions, one of ordinary skill in the art can implement a suitable bonnet structure and gate actuating mechanism to function as described (i.e., withdraw the gate sufficiently to clear the level 133). With the gate clearing the dashed line 133, the user can operate the bonnet isolating mechanism 130 to seal the valve body 122 from the bonnet 121 by turning two threaded shafts or screws 134 and 135 (isolator actuating screws) on the bonnet isolating mechanism 130 (FIG. 5) as subsequently described in further detail with reference to FIGS. 6–9.

Figure 7:
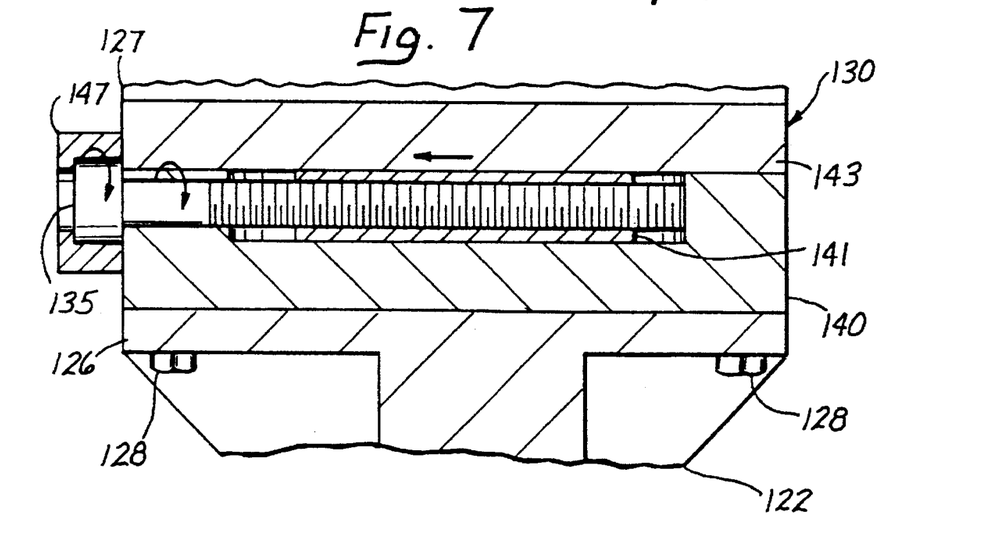
FIG. 7 is a cross sectional view of a portion of the bonnet isolating mechanism taken on line 7—7 in FIG. 6 showing manual actuation of the isolator plate.
Figure 8:
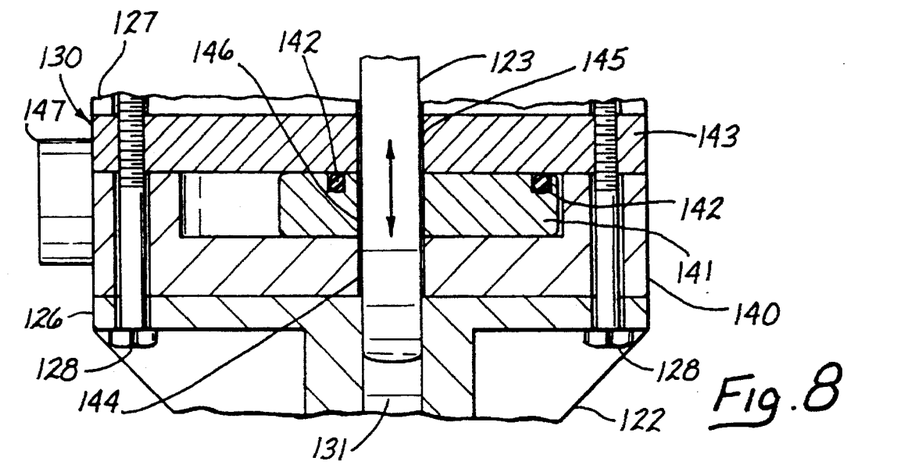
FIG. 8 is a cross sectional view taken on line 8—8 of FIG. 6 showing the isolator plate in an OPEN ISOLATING MECHANISM POSITION as the gate is moved between the CLOSED GATE POSITION and the OPEN GATE POSITION.
Figure 9:
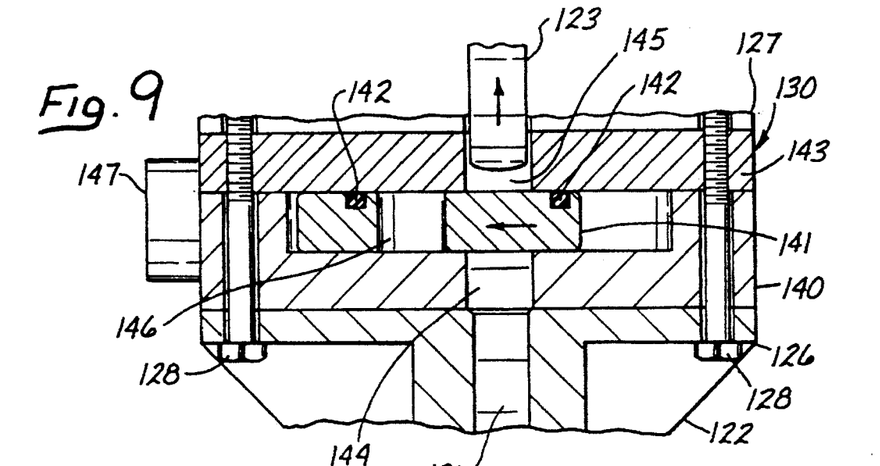
FIG. 9 is a cross sectional view similar to FIG. 8 showing the isolator plate in a CLOSED ISOLATING MECHANISM POSITION and the gate within the bonnet in the OPEN GATE POSITION.

The bonnet isolating mechanism 130 includes a steel housing 140 (FIGS. 5 and 6–9), a slideable steel plate 141 (an isolator plate 141) within the housing 140 (FIGS. 6–9), an O-ring 142 of suitable elastomeric material mounted in a groove on the isolator plate 141 (FIGS. 6, 8 and 9), the two isolator actuating screws 134 and 135 mentioned above (FIGS. 5, 6, and 7), and a steel top 143 for the housing 140 (FIGS. 5, and 7–9). The O-ring 142 seal between the top 143 and the plate 141. Although not use in the illustrated bonnet isolating mechanism 130, a second similar O-ring (not shown) can be used between the housing 140 and the plate 141.

The housing 140 fits between the flanges 126 and 127. For the size valve illustrated, it measures about 32 inches long and 15 inches wide. It is approximately one inch thick and the top 143 of the housing 140 is about one-half inch thick so that the assembled bonnet isolating mechanism measures about 1.5 inches thick. Of course, those materials and dimensions may vary significantly without departing from the inventive concepts disclosed. Among other things, size depends on the dimensions of the pipeline to be hot tapped and therefore the size of the valve to be used and the size flanges on the valve.

Figure 10:
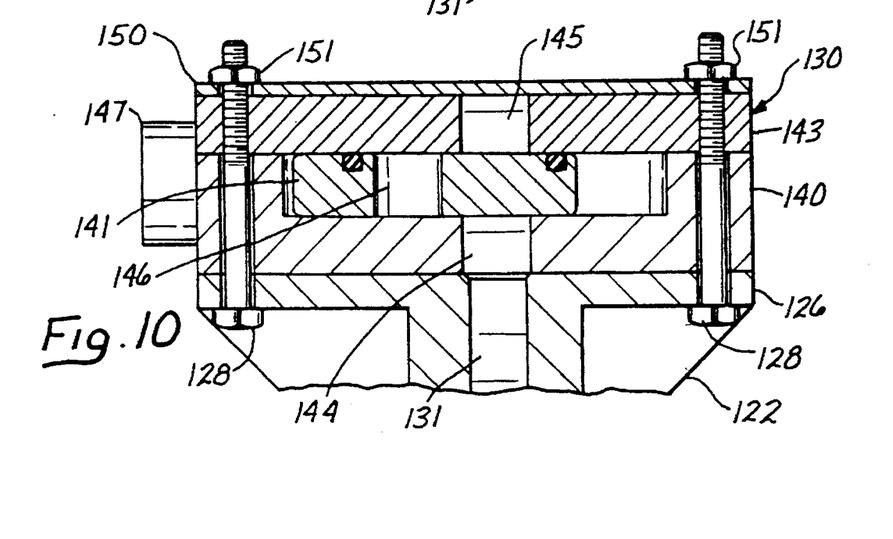
FIG. 10 is a cross sectional view similar to FIG. 9 showing the bonnet removed and a cover plate installed.

The housing 140 includes an opening 144 through the housing 140 (FIGS. 6, and 8–10). The opening 144 is about the same size as the opening 131 in the valve body 122 (FIGS. 5 and 8–10), and the top 143 of the housing 140 includes a similarly sized opening 145 (FIGS. 8–10). With the isolating mechanism 130 bolted between the flanges 126 and 127, the openings 144 and 145 align with the opening 131 so that the gate 123 can travel through the housing 140 and the top 143 of the housing 140 in moving between the CLOSED GATE POSITION and the OPEN GATE POSITION (as depicted by the double-headed arrow in FIG. 8).

In order for the gate 123 to move through the housing 140 and the top 143 of the housing 140, however, the isolator plate 141 must be in the OPEN ISOLATING MECHANISM POSITION illustrated in FIG. 8. In that position, an opening 146 in the isolator plate 141 (sized similar to the openings 144 and 145) is aligned with the openings 144 and 145. The user moves the isolator plate 141 between the OPEN ISOLATING MECHANISM POSITION illustrated in FIG. 8 to the CLOSED ISOLATING MECHANISM POSITION illustrated in FIGS. 9 and 10 by rotating the isolator actuating screws 134 and 135. Rotating the isolator actuating screws 134 and 135 clockwise as depicted for the screw 135 by the curved arrows in FIG. 7, causes the isolator plate 141 to move in the direction of the straight arrow in FIG. 7 to the CLOSED ISOLATING MECHANISM POSITION. Rotating the isolator actuating screws 134 and 135 in the opposite counterclockwise direction, moves the isolator plate 141 in the opposite direction to the OPEN ISOLATING MECHANISM POSITION.

A retainer cap 147 (FIGS. 5–10) fits loosely over the screw 135 as shown in FIG. 7, so that a user can still rotate the screw 135. The retainer cap 147 is bonded, screwed, or otherwise suitable affixed to the housing 140 or the top 143 of the housing 140 in that position where it serves to hold the isolator actuating screw 135 from backing out of the housing 140 when the isolator actuating screw 135 is turned in the counterclockwise direction. A similar retainer cap 148 (shown in FIG. 5) holds the isolator actuating screw 134. Of course other actuating arrangements may be used. From the foregoing, one of ordinary skill in the art can implement other suitable mechanisms for moving the plate 141 as described, including using hydraulic, pneumatic, and even electrical actuating components, without departing from the inventive concepts disclosed.

To use the valve 100, the user installs it on a line to be tapped as previously described. Next, with a downstream component connected to the downstream side 115 of the valve 100 and the plate 141 in the OPEN ISOLATOR MECHANISM POSITION shown in FIG. 8, the user moves the gate from the CLOSED GATE POSITION to the OPEN GATE POSITION as depicted by the upwardly pointing vertical arrow in FIG. 9.

After moving the gate 123 sufficiently to at least clear the plate 141, he rotates the isolator actuating screws 134 and 135 clockwise (as depicted in FIG. 7) to move the plate 141 to the left to the CLOSE ISOLATOR MECHANISM POSITION (as depicted by the leftwardly pointing horizontal arrows in FIGS. 7 and 9). Then, he removes the bonnet 121 and installs a cover plate 150 in its place (FIG. 10). For that purpose, he may use the same nuts 151 on the bolts 128 that were used to bolt the isolating mechanism 130 to the flange 127 of the bonnet 121. Although not used in the illustrated installation, a gasket the user may add a gasket between the cover plate 150 and the top 143 of the housing 140.

To thereafter use the valve 100 (e.g., for repair or replacement of downstream components), the user removes the cover plate 150, bolts on the original or substitute bonnet, moves the plate 141 to the OPEN ISOLATOR MECHANISM POSITION. Then, he can move the gate 123 to the CLOSED GATE POSITION to perform whatever service is desired.

Thus, the invention provides a valve with a bonnet isolating mechanism. The user removes the bonnet from the valve body, leaving just the smaller, lighter, and less expensive valve body. So, the hot tapping procedure of this invention enables use of most any downstream component, including butterfly valves, glove valves, check valves, back flow preventers, gauges, sensors, and no-valve technologies. In addition, the larger, heavier, and more expensive bonnet is free for reuse elsewhere, and a bonnet can always be reattached to the valve body whenever desired in the future for pipeline servicing.

Although an exemplary embodiment has been shown and described, one of ordinary skill in the art may make many changes, modifications, and substitutions without necessarily departing from the spirit and scope of the invention.

What is claimed is:

1. A method of tapping a line containing fluid under pressure to produce a branch line, comprising:

providing a valve having a valve body, a bonnet on the valve body, a gate, and means for enabling a user to seal the valve body from the bonnet for purposes of removing the bonnet from the valve body while the valve body contains fluid under pressure, said means including an isolating mechanism connected to the valve body in a position intermediate the valve body and the bonnet, which isolating mechanism includes a housing having a first side connected to the valve body, a second side connected to the bonnet, and an opening extending through the housing from the first side to the second side through which the gate travels in moving from a position of the gate within the valve body to a position of the gate within the bonnet, said opening being in continual fluid communication at the first side of the housing with an opening in the valve body through which the gate travels, and the isolating mechanism including means for enabling the operator to close the opening after withdrawing the entire gate from the valve body through the opening extending through the housing in order to seal the valve body from the bonnet and the entire gate;

connecting the valve body to a line to be tapped and a tapping machine to the valve body;

tapping the line through the valve body with the valve open, withdrawing the tapping machine from the valve body sufficiently to close the valve, closing the valve by advancing the gate into the valve body, removing the tapping machine from the valve body, connecting a desired downstream component to the valve body, and opening the valve by withdrawing the entire gate from the valve body through the isolating mechanism;

sealing the valve body from the bonnet and the entire gate with the isolating mechanism;

removing the bonnet and the entire gate from the valve body while leaving the valve body in place on the line and the housing connected to the valve body as components of the branch line; and attaching a cover to the second side of the housing over the opening extending through the housing.

2. A method of tapping a pipeline containing fluid under pressure to produce a branch line, comprising:

providing a valve having a valve body with first and second ports, a movable gate, a removable bonnet with means in the form of a gate actuating mechanism for enabling a user to move the gate between a CLOSED GATE POSITION in which the gate is within the valve body intermediate the first and second ports and an OPEN GATE POSITION in which the gate is entirely withdrawn from the valve body and at least partially within the bonnet, and means for enabling the user to selectively seal the valve body from the bonnet when the gate is in the OPEN GATE POSITION for purposes of removing the bonnet from the valve body while the valve body contains fluid under pressure, said means including an isolating mechanism connected to the valve body in a position intermediate the valve body and the bonnet, which isolating mechanism includes a housing having a first side connected to the valve body, a second side connected to the bonnet, and an opening extending through the housing from the first side to the second side through which the gate travels in moving from the CLOSE GATE POSITION to the OPEN GATE POSITION, said opening being in continual fluid communication at the first side of the housing with an opening in the valve body through which the travels, and the isolating mechanism including means for enabling the operator to close the opening extending through the housing after withdrawing the entire gate from the valve body through the opening extending through the housing in order to seal the valve body from the bonnet and the entire gate;

connecting the first port on the valve body to a tapping outlet on the pipeline, connecting a tapping machine to the second port on the valve body, advancing the tapping machine through the valve body with the gate in the OPEN GATE POSITION, and operating the tapping machine to thereby tap the pipeline;

withdrawing the tapping machine from the valve body sufficiently to close the valve, operating the gate actuating mechanism to move the gate to the CLOSED GATE POSITION, removing the tapping machine from the second port on the valve body, and connecting a desired downstream component to the second port;

operating the gate actuating mechanism to move the gate to the OPEN GATE POSITION by withdrawing the entire gate from the valve body through the isolating mechanism;

operating the isolating mechanism to seal off the valve body and the gate from the bonnet;

removing the bonnet and the entire gate from the valve body while leaving the valve body in place on the pipeline and the housing connected to the valve body as components of the branch line; and attaching a cover to the second side of the housing over the opening extending through the housing.

3. A valve, comprising:
   a valve body having a first port on a first side of the valve body, a second port on a second side of the valve body, and a passage connecting the first and second ports in fluid communication;
   means in the form of a movable gate for opening and closing the valve;
   a bonnet structure mounted on the valve body, the bonnet structure including means in the form of a gate actuating mechanism for enabling a user to move the gate through an opening in the valve body through which the gate travels between a CLOSED GATE POSITION in which the gate is intermediate the first and second ports on the valve body and an OPEN GATE POSITION in which the gate is entirely withdrawn from the valve body and within the bonnet structure;
   means for enabling the user to seal the valve body from the bonnet structure and the gate when the gate is in the OPEN GATE POSITION for purposes of removing the bonnet and the entire gate from the valve body while the valve body contains fluid under pressure, said means including an isolating mechanism connected to the valve body in a position intermediate the valve body and the bonnet, which isolating mechanism includes a housing having a first side connected to the valve body, a second side connected to the bonnet, and an opening extending through the housing from the first side to the second side through which the gate travels in moving from the CLOSED GATE POSITION in which the gate is within the valve body to OPEN GATE POSITION in which the gate is within the bonnet, said opening being in continual fluid communication at the first side of the housing with the opening in the valve body through which the gate travels, and the isolating mechanism including means for enabling the operator to close the opening after withdrawing the entire gate from the valve body through the opening in order to seal the valve body from the bonnet and the entire gate; and
   a cover adapted to be attached to the second side of the housing in place of the bonnet structure, over the opening that extends through the housing.

4. A valve as recited in claim 3, wherein the isolating mechanism is mounted on the valve body and the bonnet structure is mounted on the isolating mechanism so that the isolating mechanism is intermediate the valve body and the bonnet structure.

5. A valve as recited in claim 4, wherein:
   the isolating mechanism includes a movable plate that defines an opening through which the gate moves in moving between the OPEN GATE POSITION and the CLOSED GATE POSITION; and
   the isolating mechanism includes means for enabling a user to move the plate between an OPEN ISOLATING MECHANISM POSITION in which the plate is positioned so that the valve body is not sealed from the bonnet and so that the gate can travel through the opening in the plate in moving between the CLOSED GATE POSITION and the OPEN GATE POSITION, and a CLOSED ISOLATING MECHANISM POSITION in which the plate is positioned so that the valve body is sealed from the bonnet.

6. A valve as recited in claim 3, wherein the gate actuating mechanism includes a handwheel for enabling a user to actuate the gate manually by rotating the handwheel.

7. A method of tapping a line containing fluid under pressure to produce a branch line, comprising:
   providing a valve having a valve body, a gate, a gate actuating mechanism, and means for enabling a user to seal the valve body from the gate and the gate actuating mechanism for purposes of removing the entire gate and the gate actuating mechanism from the valve body while the valve body contains fluid under pressure, said means including an isolating mechanism connected to the valve body in a position intermediate the valve body and the gate actuating mechanism, which isolating mechanism includes a housing having a first side connected to the valve body, a second side connected to the bonnet, and an opening extending through the housing from the first side to the second side through which the gate travels in moving from a closed position of the gate to an open position of the gate, the opening extending through the housing being in continual fluid communication at the first side of the housing with an opening in the valve body through which the gate travels, and the isolating mechanism including means for enabling the operator to close the opening extending through the housing after withdrawing the entire gate from the valve body through the opening extending through the housing in order to seal the valve body from the entire gate and the gate actuating mechanism;
   connecting the valve body to a line to be tapped and a hot tapping machine to the valve body;
   tapping the line through the valve body with the valve open, withdrawing the hot tapping machine from within the valve body sufficiently to close the valve, closing the valve by withdrawing the entire gate from the valve body through the opening in the isolation mechanism, removing the hot tapping machine from the valve body, and connecting a desired downstream component to the valve body;
   sealing the valve body from the gate and the gate actuating mechanism with the isolating mechanism;
   removing the bonnet and the entire gate from the valve body while leaving the valve body in place on the line and the housing connected to the valve body as components of the branch line; and
   attaching a cover to the second side of the housing over the opening extending through the housing.

8. A valve, comprising:
   a valve body having a first port on a first side of the valve body, a second port on a second side of the valve body, and a passage connecting the first and second ports in fluid communication;
   means in the form of a movable gate for opening and closing the valve;
   means in the form of a gate actuating mechanism for enabling a user to move the gate through an opening in the valve body through which the gate travels between a CLOSED GATE POSITION in which the gate is intermediate the first and second ports on the valve body and an OPEN GATE POSITION in which the gate is entirely withdrawn from the valve body;
   means mounted on the valve body for enabling the user to seal the valve body from the gate and the gate actuating mechanism when the gate is in the OPEN GATE POSITION for purposes of enabling the user to remove the entire gate and the gate actuating mechanism from the valve body while the valve body contains fluid under pressure;
   said means including an isolating mechanism connected to the valve body in a position intermediate the valve body and the gate actuating mechanism, which isolating mechanism includes a housing having a first side connected to the valve body, a second side connected to the bonnet, and an opening extending through the housing from the first side to the second side through which the gate travels in moving from the CLOSED GATE POSITION to the OPEN GATE POSITION, the opening through the housing being in continual fluid communication at the first side of the housing with the opening in the valve body through which the gate travels, and the isolating mechanism including means for enabling the operator to close the opening extending through the housing after withdrawing the entire gate through the opening in order to seal the valve body from the entire gate and the gate actuating mechanism; and a cover adapted to be attached to the second side of the housing in place of the bonnet structure over the opening extending through the housing.

* * * * *